United States Patent [19]

SenGupta et al.

[11] Patent Number: 4,635,882

[45] Date of Patent: Jan. 13, 1987

[54] METHOD AND APPARATUS FOR REDUCING LOW TO MID FREQUENCY INTERIOR NOISE

[75] Inventors: Gautam SenGupta, Renton, Wash.; Byron R. Spain, Mulvane, Kans.

[73] Assignee: The Boeing Company, Seattle, Wash.

[21] Appl. No.: 724,787

[22] Filed: Apr. 18, 1985

Related U.S. Application Data

[63] Continuation of Ser. No. 206,574, Nov. 14, 1980, abandoned, which is a continuation of Ser. No. 29,705, Apr. 11, 1979, abandoned.

[51] Int. Cl.⁴ .............................................. B64C 1/00
[52] U.S. Cl. ..................................... 244/119; 188/378
[58] Field of Search .............. 244/119, 117, 131, 132; 188/378, 379; 52/145, 144, 403, 398, 222, 346, 730, 731, 732, 347; 428/594, 595, 598; 181/287, 284, 290, 293

[56] References Cited

U.S. PATENT DOCUMENTS

| | | | |
|---|---|---|---|
| 2,877,970 | 3/1959 | Albertine et al. | 188/1 B X |
| 3,071,217 | 1/1963 | Gould | 244/119 X |
| 3,078,969 | 2/1963 | Campbell et al. | 188/1 B X |
| 3,078,971 | 2/1963 | Wallerstein, Jr. | 188/1 B X |
| 3,079,277 | 2/1963 | Painter | 188/1 B X |
| 3,088,561 | 5/1963 | Ruzicka | 188/1 B X |
| 3,160,549 | 12/1964 | Caldwell et al. | 188/1 B |
| 3,327,812 | 6/1967 | Lazan | 188/1 B |
| 3,827,530 | 8/1974 | Heath | 188/1 B X |
| 3,842,945 | 10/1974 | Potter | 188/1 B |
| 3,872,950 | 3/1975 | Ashfield et al. | 188/1 B |
| 3,976,269 | 8/1976 | SenGupta | 244/119 |

Primary Examiner—Douglas C. Butler
Attorney, Agent, or Firm—Christensen, O'Connor, Johnson & Kindness

[57] ABSTRACT

A method and apparatus for reducing the low to mid frequency interior noise of a reinforced skin structure, such as the cabin of a jet aircraft, by reducing the vibration response of the structure to low to mid frequency disturbances is disclosed. Interior noise is reduced by forming the structure such that the skin panels bounded by reinforcing components have a higher fundamental frequency than the combined bending and tuning fork frequency of reinforcing components with spaced apart legs that support the skin; and, damping the bending, tuning fork and torsional vibration of the reinforcing components. Damping is accomplished by bridging the spaced apart legs of the reinforcing components with rigid elements, viscoelastically attached at either end to the legs. Preferably, the viscoelastic attachment is via flanges that extend outwardly from the legs. The entire length of the reinforcing components may be spanned by a single rigid element; or, a series of spaced apart rigid elements may span the reinforcing components. When spaced apart rigid elements are used, preferably, they are centered at the antinodal points of the reinforcing components, as determined by the frequency of the noise produced in the interior of the body by the vibration of an undamped reinforcing component. If the interior noise covers a spectrum, the antinodal points are determined by the frequency of the major contributor(s) to the interior noise.

49 Claims, 9 Drawing Figures

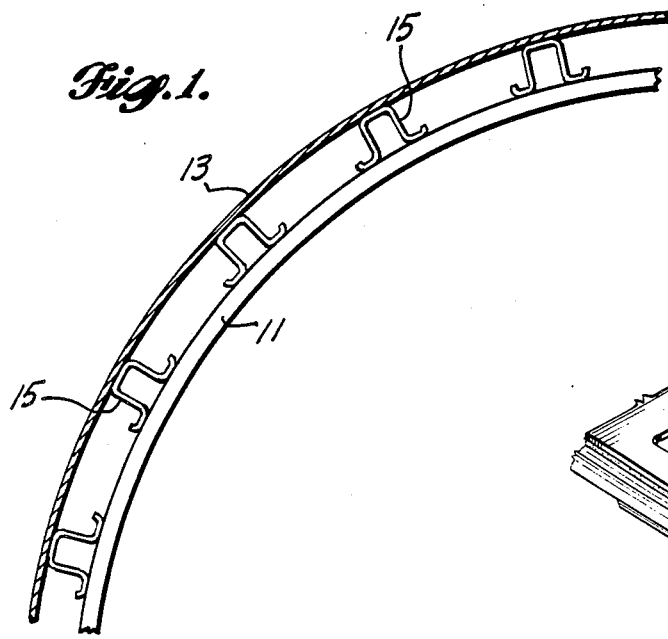
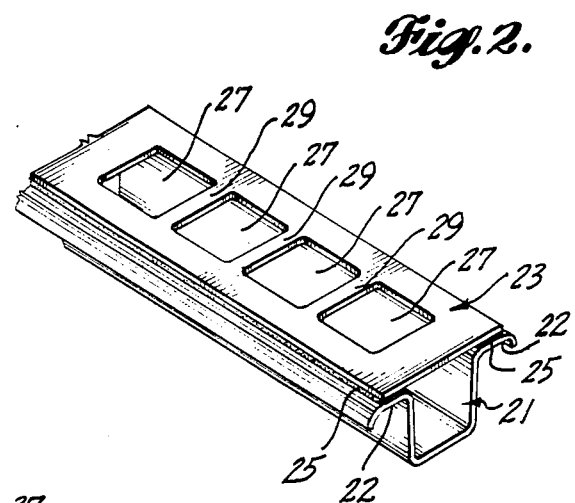
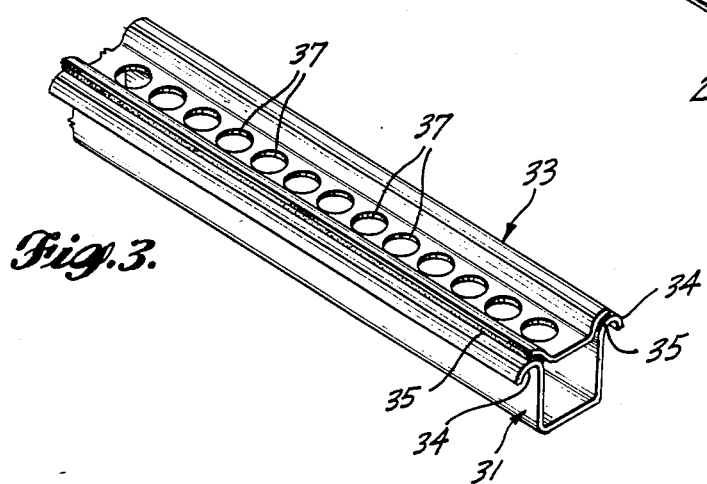
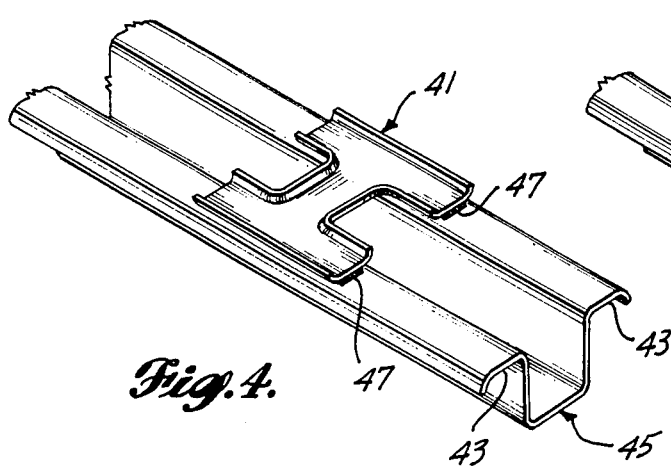
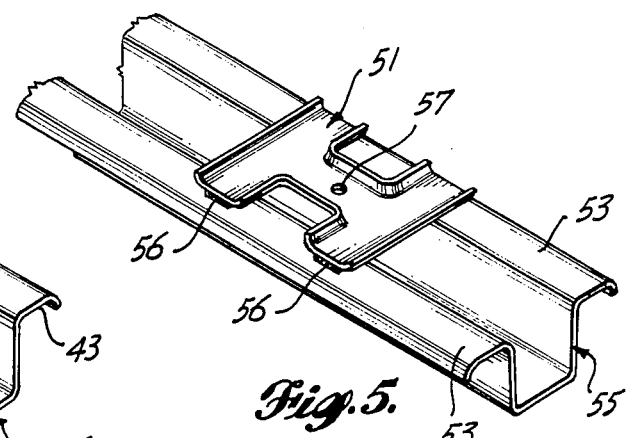

METHOD AND APPARATUS FOR REDUCING LOW TO MID FREQUENCY INTERIOR NOISE

This application is a continuation application based on prior copending application Ser. No. 206,574, filed Nov. 14, 1980 which is a continuation of prior copending application Ser. No. 029,705 filed Apr. 11, 1979, both abandoned.

TECHNICAL FIELD

This invention is directed to noise reduction and, more particularly, to low to mid frequency noise reduction.

BACKGROUND OF THE INVENTION

As will be better understood from the following description, the present invention was developed for use in the reduction of low to mid frequency noise in the interior, e.g., cabin, of a jet aircraft fuselage. However, while developed for use in an aircraft environment, the invention can also be used in other environments. For example, the invention can be used in other reinforced skin structure vehicles, such as train cars, boats, etc., to reduce low to mid frequency noise. Further, the invention could be used in stationary reinforced skin structures (if constructed of appropriate elements) to reduce the amount of low to mid frequency interior noise in such structures. In addition to reducing low to mid frequency interior noise, the invention also reduces sonic fatigue. More specifically, sonic fatigue occurs as a result of the vibration of structural components. As will be understood from the following description of the invention, the invention reduces noise by reducing the vibration of structural components. As a result, the invention also reduces sonic fatigue, or better stated, increases the sonic fatigue life of a reinforced skin structure incorporating the invention.

Noise inside of a reinforced skin structure, such as the cabin of an aircraft, affects speech communication, comfort, composure and sleep. As a result, it is desirable to maintain interior noise as low as possible. When weight and size are insignificant factors, the designer has relatively wide latitude in the choice of materials and techniques that can be utilized to reduce interior noise. However, in many environments, severe constraints are placed on what steps a designer can take to reduce interior noise. For example, the high power and light weight requirements of commercial jet aircraft severely restrict the devices and techniques that an aircraft designer can use to reduce interior noise to a level comparable with that of other forms of transportion.

It has been found that aircraft cabin noise in the 600 Hz and above frequency range can be treated adequately with skin damping tape, lead vinyl sheeting and fiberglass insulation. However, these devices for treating noise are virtually ineffective at low to mid frequencies. As a result, low to mid frequency cabin noise has remained undesirably high. Moreover, recently developed short takeoff and landing (STOL) aircraft, such as upper surface blown (USB) and externally blown flap (EBF) aircraft, have even higher levels of low to mid frequency interior noise than previously developed jet aircraft. Increased low to mid frequency interior noise occurs because of the proximity of the jet engines of STOL aircraft to the fuselage, the production of low to mid frequency noise disturbances created during the operation of such aircraft, and the fuselage excitation caused by the high degree of correlation and coherence of the fluctuating pressure field surrounding the aircraft. As a result of these new jet aircraft developments, it has become even more important that methods and apparatus for reducing low to mid frequency aircraft cabin noise be developed.

In the past, it was generally believed that aircraft cabin noise below about 600 Hz was controlled by the structural stiffness of the aircraft's fuselage. As a result, attempts to reduce low to mid frequency cabin noise were directed toward increasing the structural stiffness of the fuselage. The number of stiff stringers in one modern aircraft was doubled, in an attempt to reduce low to mid frequency cabin noise. However, test data on this aircraft indicated that although a 100 percent increase in the stringer weight was effective in reducing cable noise in the 300–600 Hz band, it was very ineffective below 300 Hz. Thus, although this approach improved the subjective impression of the cabin noise level, the overall sound pressure level was virtually uneffected.

In another attempt to reduce low to mid frequency noise, nomex honeycomb panels were bonded to the fuselage skin panels of a jet aircraft cabin between the stringers and the frames. Although a significant improvement was made in the 600 Hz and above frequency range, the low to mid frequency noise level and the overall sound pressure level remained virtually uneffected.

More recently it has been found that low frequency cabin noise at takeoff (i.e., when the fuselage structure is unpressurized) can be significantly reduced by designing the fuselage such that the skin and stringers are intrinsically tuned and then damping the vibration of the stringer flanges. In this regard, attention is directed to U.S. Pat. No. 3,976,269 entitled "Intrinsically Tuned Structural Panel" by Gautam SenGupta. While the invention described in this patent is useful in designing a fuselage so that low frequency noise at takeoff is low and so that the sonic fatigue life of the stiffened fuselage skin is improved, these beneficial advantages are lessened during cruise because inplane loads due to cabin pressurization play a very significant role in determining the fuselage structural response to external disturbances, e.g., jet noise and boundary layer turbulence. Because the cruise portion constitutes a substantial portion of most fights, it is, of course, desirable that low to mid frequency noise be maintained at as low as level as possible during cruise, as well as during takeoff and landing.

Therefore, it is an object of this invention to provide a method and apparatus for reducing low to mid frequency noise.

It is another object of this invention to provide a method of an and apparatus for reducing low to mid frequency noise in the interior of a reinforced skin structure.

It is a further object of this invention to provide a method of and an apparatus for reducing the low to mid frequency noise in the interior of a structure comprising a skin supported by reinforcing components, and simultaneously extend the fatigue life of the structure.

It is yet another object of this invention to provide a method of and an apparatus for reducing the vibrational response of an aircraft fuselage to low to mid frequency disturbances and, thereby, reduce the low to mid frequency interior noise in the cabin of the aircraft and, increase the sonic fatigue life of the aircraft.

It is still another object of this invention to provide a method and apparatus for reducing the interior noise in the cabin of an aircraft that is functional during all phases of a flight.

SUMMARY OF THE INVENTION

In accordance with this invention, a method of an apparatus for reducing the interior noise of a structure, formed of a skin and reinforcing components (at least some of which have spaced apart legs) by reducing the vibrational response of the structure to low to mid frequency disturbances, is provided. Since vibration response is reduced, the sonic fatigue life of the structure is also improved by the invention.

The method of the invention generally comprises the steps of: forming a reinforced skin structure such that the skin panels bounded by reinforcing components have a higher fundamental frequency than the fundamental frequency of skin reinforcing components having spaced apart legs; and, damping the bending, tuning fork and torsional vibration of the spaced apart legs with rigid elements that are viscoelastically attached to either end to the legs. The apparatus of the invention comprises a reinforced skin structure formed such that its skin has a higher fundamental frequency than the fundamental frequency of skin reinforcing components having spaced apart legs; and, rigid damping elements bridging the spaced apart legs, and viscoelastically attached thereto, for damping the bending, tuning fork and torsional vibration of the reinforcing components.

Since the apparatus of the invention can be applied to existing reinforced skin structures wherein the structure already has a skin having a higher fundamental frequency than the fundamental frequency of skin reinforcing components having spaced apart legs, the apparatus also comprises an improvement for such structures, the improvement comprising rigid damping elements mounted across the viscoelastically attached to the spaced apart legs of said skin reinforcing components.

The rigid damping elements may span the entire length of the reinforcing components or may be located at spaced apart points. When spaced apart rigid damping elements are used, preferably, the rigid damping elements are centered at the antinodal points of the reinforcing components, as determined by the frequency of the low to mid frequency noise produced in the interior of the body by nondamped reinforcing components. If the noise covers a spectrum, the antinodal points chosen are determined by the frequency of the major contributor(s) to the low to mid frequency noise. The rigid damping elements may be solid, or apertured in order to reduce weight. Further, the rigid damping elements may include holes for receiving bolts or screws adapted to hold other items located in the wall of the reinforced skin structure, such as an insulation blanket, in place. Preferably, the rigid damping elements are formed of the same material as the reinforcing components and are of equal thickness. However, they may be formed of dissimilar materials, or may be formed of similar or dissimilar materials of different thicknesses. In general, the rigid damping elements can be formed of any suitably rigid metal or plastic.

While a weight penalty is associated with designing a body, such as the fuselage of an aircraft, so that the fundamental frequency of its skin is higher than the fundamental frequency of its skin reinforcing components, because such a result is normally achieved by reducing stringer spacing, increasing skin thickness, or both, the weight penalty may be offset by the removal of presently included sonic treatment devices. For example, in an aircraft, presently used vinyl sonic treatment layers can be removed or reduced.

As will be appreciated by those familiar with the treatment of noise, when, in accordance with this invention, skin fundamental frequency is made higher than reinforcing component fundamental frequency, the coupled mode of the overall structure is such that the skin acts like a very stiff member, supported by relatively flexible support members. This structure is a strong radiator of sound, because a large section of the skin vibrates in phase at audio frequencies. Since the skin responds like a very stiff member, very little skin flexural bending action takes place in response to a low to mid frequency disturbance. Rather, the flexible support members vibrate. For this reason, reducing the vibration response of the flexible support members by damping them in accordance with the invention is very effective in reducing response to low to mid frequency disturbances. Since vibration is reduced, the low to mid frequency noise created by low to mid frequency vibrations is reduced and sonic fatigue life is improved.

As will be appreciated by those familiar with the viscoelastic damping treatment of vibrating bodies, damping occurs as a result of the conversion of vibratory energy to heat, which is due to the shearing of the viscoelastic material. The magnitude of the conversion is related to the size of the surface area covered by the viscoelastic material. As a result, the present invention works best when the legs bridged by the rigid damping elements include outwardly projecting flanges and the bridging elements are viscoelastically attached to the flanges. Further, because the flanges must be free to vibrate in order to be damped, the legs must be spaced away from the skin. For example, assuming the reinforcing component is a top-hat component (i.e., it has the cross-sectional configuration of a top-hat), the skin must be attached to the cross-member, not the flanges of the top-hat; and, the rigid damping elements must bridge the flanges of the top hat. This arrangement maximizes damping because the rigid damping elememts are spaced the maximum distance from the skin-reinforcing component neutral axis.

As will be appreciated from the foregoing description, the invention provides an uncomplicated and relatively inexpensive method and apparatus for reducing low to mid frequency noise in the interior of a reinforced skin structure, such as the cabin of a jet aircraft. With respect to aircraft noise reduction, as will be readily appreciated by those familiar with the design of aircraft fuselages, during cruise, the fundamental frequency of the skin is inherently higher than the fundamental frequency of the stringers supporting the skin, because of the in-plane tensile loads carried by the skin, due to cabin pressurization. Therefore, as noted above, the invention can be used to damp the stringers of an existing airplane fuselage with no other structural modification. In other words, while fuselages may have to be redesigned to meet the requirement that the skin fundamental frequency be higher than the stringer fundamental frequency when the cabin is unpressurized, if it is only desired to reduce low to mid frequency noise during cruise, present aircraft do not have to be changed. Rather, only damping elements need to be added to the stringers. Conversely, if it is desired to reduce low to mid frequency noise regardless of whether the aircraft is pressurized or unpressurized, then present fuselages have to be modified if they do not meet the requirement that the fundamental frequency of the skin be higher than the fundamental frequency of the stringers when the aircraft is unpressurized.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a cross-sectional view of a portion of the fuselage of an aircraft;

FIG. 2 is a perspective view illustrating one embodiment of a rigid damping element formed in accordance with the invention;

FIG. 3 is a perspective view of an alternative embodiment of a rigid damping element formed in accordance with the invention;

FIG. 4 is a perspective view of another alternative embodiment of a rigid damping element formed in accordance with the invention;

FIG. 5 is a perspective view of a further alternative embodiment of a rigid damping element formed in accordance with the invention;

DESCRIPTION OF THE PREFERRED EMBODIMENT

Figure 6:
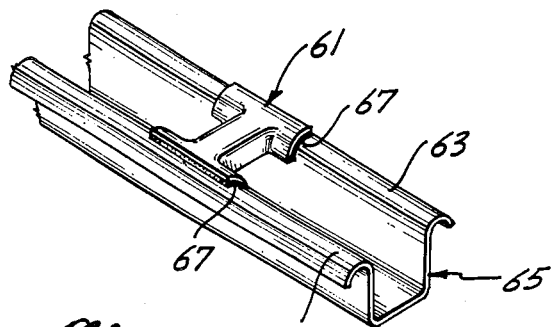
FIG. 6 is a perspective view of still another alternative embodiment of a rigid damping element formed in accordance with the invention.

FIG. 1 is a cross-sectional view of a portion of the wall of a reinforced skin structure, specifically the fuselage of an aircraft, and includes: a portion of a frame 11; a portion of the skin 13; and, a series of skin reinforcing elements, e.g., stringers 15. In a conventional manner, the frame 11 is circular and supports the stringers 15 at spaced apart locations. The stringers, in turn, support the skin 13. The stringers 15 are what is commonly referred to as "top-hat" stringers. That is, the stringers 15 have a U-shaped cross-sectional configuration with flanges that project outwardly from the legs of the U. The flanges of the stringers 15 are attached to the frame 11 by conventional attachment devices. The skin 13, which comprises a plurality of panels, is attached to the cross-members of the top-hat stringers 15.

In accordance with the invention, the reinforced skin structure illustrated in FIG. 1 is designed such that the fundamental frequency of the skin is higher than the fundamental frequency of the stringers when the aircraft is unpressurized, if it is desired to reduce low to mid frequency interior noise during takeoff as well as during cruise. This result is achieved by controlling the relationship between stringer spacing and skin thickness so that this frequency relationship exists. For example, once a desired skin thickness is chosen, stringer spacing is adjusted so that the desired fundamental frequency relationship is achieved. Alternatively, a desired stringer spacing may be chosen and the skin thickness adjusted (e.g., chosen) so that the desired fundamental frequency relationship is achieved. In other words, either parameter may form an independent variable, whereby the other parameter becomes a dependent variable. Still further, both parameters can be varied as long as the required fundamental frequency relationship occurs. (Obviously, other requirements will enter into these choices, such as the minimum allowable skin thickness, for example.)

While it may be necessary to change the skin thickness and stringer spacing of present aircraft so that the fundamental frequency of the skin is higher than the fundamental frequency of the stringers at takeoff (when the aircraft is unpressurized) this requirement is met by present aircraft during cruise (when the cabin of the aircraft is pressurized), because during cruise the skin frequency is inherently higher than the stringer frequency due to the in-plane tensile load carried by the skin. Thus, if only low to mid frequency noise reduction during cruise is desired, aircraft that do not meet the foregoing requirement during takeoff do not need to be restructured. Contrariwise, if low to mid frequency noise is to be reduced during takeoff as well as cruise and a particular aircraft does not meet the foregoing requirement during takeoff, fuselage restructuring will be required.

As discussed in the introduction, when skin fundamental frequency is higher than stringer fundamental frequency, the coupled mode of the composite structure is such that the skin acts like a very stiff member, supported by relatively flexible stringers. This coupled mode is a strong radiator of sound because a large section of the skin vibrates in phase. Since the skin responds like a very stiff member, very little skin flexural bending action takes place. On the other hand, the response of this coupled mode to low to mid frequency disturbances is strongly determined by the deflection of the relatively flexible stringers. For this reason, damping the stringers is a very effective way of reducing the vibration response of the overall structure to low to mid frequency disturbances. Reducing low to mid frequency vibration response, of course, reduces low to mid frequency noise because vibrations create noise. In addition, reducing vibration response increases the sonic fatigue life of the vibrating structure.

It has been found that there is a strong coupling between stringer bending modes and the modes associated with stringer cross-sectional distortions. Top-hat stringers, such as those illustrated in FIG. 1, for example, vibrate in bending. In addition, the two free flanges tend to move toward and away from one another, resulting in a tuning-fork made of operation. Further, the stringers can vibrate in torsion. In accordance with the invention, the bending, tuning-fork and torsional vibration response of the stringers to low to mid frequency disturbances is reduced. The reduction is accomplished by connecting the moving legs of the stringers together through a rigid damping element attached to the stringer flanges by a layer of viscoelastic material. As will be better understood from the following discussion of specific examples of rigid damping elements, the elements may extend the entire length (or substantially the entire length) of the stringers, between the frames, or may comprise a plurality of spaced apart elements mounted at predetermined locations. In one actual test, two small metal strips (0.7 inches×2.5 inches×0.063 inches) mounted across the stringers flanges and coupled thereto by a thin (0.010–0.020 inches) layer of viscoelastic material reduced the vibration response of the stringer over a wide frequency range, including the low frequency range i.e., the frequency range below 300 Hz. A significant reduction in stringer vibration response with a weight penalty of less than 4 percent of the stringer weight was achieved. Further reductions can be obtained by damping the stringer flanges. That is, in addition to including bridging rigid damping elements, the application of a constraining element along the entire length of the flanges further reduces vibration response. FIGS. 2–9 illustrate specific examples of rigid damping elements that accomplish these results.

FIG. 2 illustrates a portion of a top-hat stringer 21. Mounted across the flanges 22 of the top-hat stringer is a rigid apertured plate 23. The apertured plate 23 is illustrated as spanning the length of the stringer 21. Located along the longitudinal edges of the apertured plate 23, between the apertured plate 23 and the flanges 22 of the top-hat stringer 21, are layers of viscoelastic material 25.

The apertured plate 23 includes a plurality of spaced-apart, side-by-side apertures 27. While the apertures 27 are illustrated as square, obviously, they can take on other configurations, such as circular, rectangular, etc. In any event, the apertures 27 are separated by rigid bars 29.

Preferably, the apertured plate 23 is formed of the same material as, and has a thickness generally equal to, that of the top-hat stringer 21. For example, if the stringers is formed of aircraft grade aluminum, the apertured plate is preferably formed of the same material. Alternatively, the apertured plate may be formed of a dissimilar material. In this regard, the apertured plate can be formed of a suitably rigid plastic, as well as a suitably rigid metal.

Preferably, the thicknesses of the viscoelastic layers 25 fall within the range indicated above (e.g., 0.010–0.020 inches). While various viscoelastic materials can be utilized, preferably, the energy conversion parameter of the one chosen peaks in the temperature and frequency range of the environment in which the invention is to be utilized. That is, as will be readily appreciated by those familiar with viscoelastic materials, such materials convert vibration energy into heat due to the shearing action that occurs in the viscoelastic layer. The conversion of vibration energy to heat is temperature and frequency dependent; and, in each frequency band, a given viscoelastic material has a range of temperatures in which its damping effectiveness is maximum. As a result, for maximum damping effectiveness in a given frequency range, the chosen viscoelastic material should peak as near to temperature of the environment of use of the invention as possible. Suitable viscoelastic materials are sold by the Minnesota Mining and Manufacturing Company, Minneapolis, Minn. under the identification numbers ISD-113 (peaks in the 0 to +15 F. range), ISD-112 (peaks at room temperature, i.e., approximately 70 F. ) and ISD-830 (peaks in the 0 to −20 F. range).

In summary, FIG. 2 illustrates a rigid damping element comprising an apertured plate 23 and layers of viscoelastic material for attaching the plate so that the opening between the legs of the top-hat stringer 21 is spanned. The rigid damping element damps vibrations. Specifically, vibrations are damped by the viscoelastic layers converting vibration energy into heat energy. Bending, tuning fork and torsional vibrations are all damped. Tuning fork and torsional vibrations are damped because the flanges of the top-hat stringer are tied together by the rigid bars 29. Bending vibrations are damped because the longitudinal edges of the apertured plate are viscoelastically coupled to the flanges. Thus, if the flanges vibrate in bending, these vibrations are also converted into heat energy. Since the vibration response of the stringers is reduced, the noise resulting from such vibrations is reduced. Further, the sonic fatigue life of the stringers is increased. Not only is the rigid damping element effective in the mid-frequency range, it is also effective in the low frequency range.

FIG. 3 illustrates an alternative embodiment of a rigid damping element. Specifically, FIG. 3 illustrates a top-hat stringer 31 having an apertured plate 33 mounted across the flanges 34 of the top-hat stringer 31. Viscoelastic layers 35 lie between the edges of the apertured plate 33 and the flanges of the top-hat stringer 31. However, rather than being flat, as in FIG. 2, the apertured plate 33 follows the curvature of the flanges 34 of the top-hat stringer 31. After curving inwardly so as to follow the flanges 34 of the top-hat stringer 31, the apertured plate spans the opening between the legs of the top-hat stringer 31. Hence, the apertured plate 33 has the cross-sectional configuration of a flattened U. The spanning portion of the apertured plate 33 includes a plurality of apertures 37. While the apertures 37 are illustrated as circular in FIG. 3, obviously, they could have other shapes. As with the FIG. 2 apertured plate, the FIG. 3 apertured plate spans the entire length (or substantially the entire length of the stringer). Since the operation of the rigid damping element illustrated in FIG. 3 is identical to the operation of the rigid damping element illustrated in FIG. 2, its operation will not be described here, in order to avoid a duplicative description.

As will be understood from the foregoing discussion, FIGS. 2 and 3 illustrate apertured plates 23 and 33, respectively, which extend substantially the entire length of the illustrated stringers 21 and 31. Contrariwise, FIGS. 4–7 illustrate rigid damping elements adapted to be located at predetermined spaced apart positions along the longitudinal length of a stringer or other skin reinforcing component having spaced apart legs. While having different specific configurations, as hereinafter described, the rigid damping elements illustrated in FIGS. 4–7 are generally H-shaped.

FIG. 4 illustrates a rigid element 41 mounted across the flanges 43 of a top-hat stringer 45. As noted above, the rigid element 41 is generally H-shaped. All of the edges of the rigid element 41 (except for the ends of the legs of the H) curve outwardly to add strength and prevent the rigid element from buckling under normal loads. The rigid element 41 is positioned such that the legs of the H-section lie parallel to the flanges 43 of the top hat stringer 45. Located between the legs of the rigid element 41 and the flanges 43 are layers of viscoelastic material 47.

As with the other embodiments of the invention, the rigid element 41 is formed of a rigid material, preferably substantially equal in thickness to the thickness of the top-hat stringer 45 and formed of the same material. More specifically, preferably the rigid element is formed of the same metal used to form the stringer 45.

Alternatively, the rigid element may be formed of a suitably rigid plastic.

FIG. 5 illustrates an H-shaped rigid element 51 similar to the rigid element 41 illustrated in FIG. 4. The primary difference is that the rigid element 51 is mounted such that legs of the rigid element, rather than the cross-member, lie orthogonal to the flanges 53 of the illustrated top-hat stringer 55. Located in the region where the legs of the rigid element 51 overlie the flanges 53 are layers of viscoelastic material 56. FIG. 5 also illustrates a hole 57 in the cross-member of the rigid element 51. The hole allows items located in the wall of the fuselage, such as insulation blankets and the like, to be attached. That is, bolts mounted in the holes can be used to either hold clips designed to attach such items to the rigid element 51, or may be directly used to attach such items.

FIG. 6 illustrates an H-section rigid element 61 having legs that curve in a manner that corresponds to the curvature of the flanges 63 of the illustrated top-hat stringer 65. Located between the curved legs of the rigid element 61 and the flanges 63 are layers of viscoelastic material 67. The cross-member of the rigid element 61 also curves inwardly. The inward curvature of the cross-member adds stiffness and prevents buckling.

Figure 7:
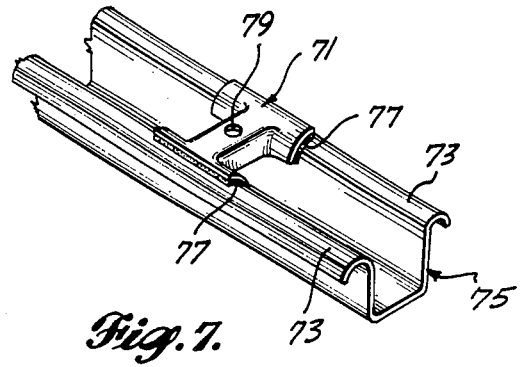
FIG. 7 is a perspective view of yet another alternative embodiment of a rigid damping element formed in accordance with the invention.

FIG. 7 illustrates an H-shaped rigid element 71, similar to the rigid element 61 illustrated in FIG. 6, mounted across the flanges 73 of a top-hat stringer 75. Again, viscoelastic layers 77 are located between the curved legs of the rigid element 71 and the flanges 73 of the top-hat stringer 75. The only difference between FIG. 6 and FIG. 7 is that FIG. 7 illustrates a hole 79 located in the cross-member of the rigid element 71. As with the hole illustrated in FIG. 5, the hole 79 can be used to hold insulation blankets and other elements in place in the wall of the fuselage.

As noted above, the rigid damping elements illustrated in FIGS. 4–7, which comprise a rigid element and attachment layers formed of a viscoelastic material, are mounted at spaced apart locations along the longitudinal length of the skin reinforcing component, e.g., stringer, to be damped. The mounting positions are based on the frequency of the major contributor(s) to the noise to be reduced in the interior (e.g., cabin) of the reinforced skin structure (e.g., fuselage of an aircraft). The frequency of the noise, of course, is directly related to the vibration frequency of the skin reinforcing components. The mounting positions are at the antinodal points located along the component as determined by the major contributor to the noise frequency. For example, if the frequency of the major contributor to interior noise is 250 Hz, the 250 Hz antinodal points determine where the rigid damping elements are to be mounted. These antinodal points can be determined analytically or by vibrating an undamped skin-stringer panel using a 250 Hz source and experimentally locating the antinodal points using instruments such as accelerometers. As will be readily appreciated, positioning the rigid damping elements at the antinodal points maximizes the amount of damping created by these elements.

While the spaced apart rigid damping elements illustrated in FIGS. 4–7 are not as effective as the continuous rigid damping elements illustrated in FIGS. 2–3 with respect to the damping of stringer bending vibration, the spaced apart rigid damping elements do have some effect on this mode also. The FIGS. 4, 6 and 7 embodiments are more effective in this regard since they provide for more longitudinal flange area contact than the FIG. 5 embodiment.

Figure 8:
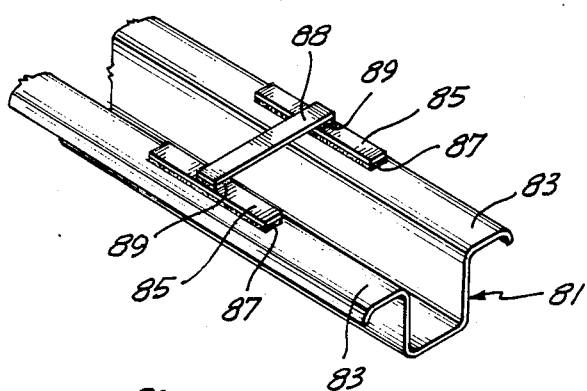
FIG. 8 is a perspective view of a still further alternative embodiment of a rigid damping element formed in accordance with the invention; and, FIG. 9 is a perspective view of yet a still further alternative embodiment of a rigid damping element formed in accordance with the invention.
Figure 9:
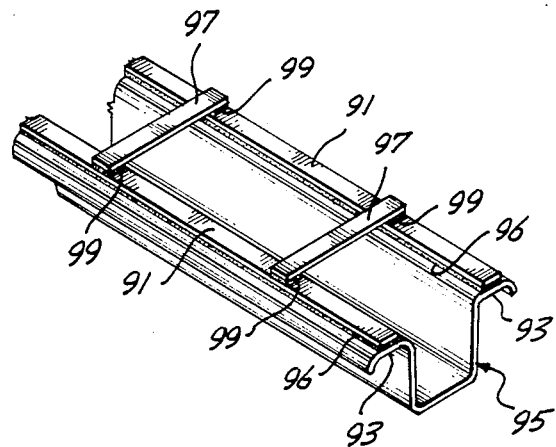

FIGS. 8 and 9 illustrate slightly different embodiments of rigid damping elements formed in accordance with the invention. The primary difference being that the FIGS. 8 and 9 embodiments use different bars for bending, tuning fork and torsional vibration reduction rather than a single composite element. Specifically, FIG. 8 illustrates a top-hat stringer 81. Mounted in predetermined positions on the outer surface of opposing flanges 83 of the top-hat stringer 81 are pairs of thin rigid base bars 85. Located between the thin rigid base bars 85 and the flanges 83 are viscoelastic layers 87. A thin rigid crossbar 88 is mounted across each pair of thin rigid base bars 85. Located between the thin rigid crossbar 88 and the associated pair of thin rigid base bars 85 are viscoelastic layers 89. Thus, FIG. 8 illustrates an embodiment of the invention comprising crossbars that are viscoelastically coupled to base bars that, in turn, are viscoelastically coupled to the flanges of the skin reinforcing component whose vibration is to be damped. In an actual embodiment of the invention, a series of rigid damping elements of the type illustrated in FIG. 8 would be located along the longitudinal length of the stringer 81. The rigid damping element illustrated in FIG. 8 provides longitudinal flange damping in the flange areas attached to the base bars 85 and tuning fork damping in the region of the crossbars.

FIG. 9 illustrates a structure of the type illustrated in FIG. 8, except that the thin rigid base bars 91 extend along the entire length of the flanges 93 of a top-hat stringer 95 and are attached thereto by viscoelastic layers 96. Mounted across the elongate thin rigid base bars 91 are a series of spaced apart, thin, rigid cross-bars 97, attached to the elongate base bars 91 by viscoelastic layers 99. Obviously, the FIG. 9 rigid damping base bars 91 provide better longitudinal flange damping than the spaced apart rigid base bars 85 illustrated in FIG. 8.

It will be appreciated from the foregoing description that the invention provides a new and improved method and apparatus for reducing the low to mid frequency vibration response of a reinforced skin structure, such as the fuselage of an aircraft. Reduction of the vibration response diminishes the noise created in the cabin of the aircraft as a result of such vibrational response and, further, increase the sonic fatigue life of the fuselage. As noted above, the invention can be used in structures other than the fuselage of an aircraft to accomplish the same results. In addition, it should be noted that skin reinforcing components other than a top-hat section stringers can be damped using the invention. For example, U-shaped sections, i.e., those without flanges can be damped. However, it may be necessary to apply or form flanges on such U-sections at the points where the bridging elements are to be located because the edge attachment area of most U-shaped sections is inadequate for viscoelastic coupling. Further, stringers and beams having cross-sectional configurations other than U-shapes can be damped using the invention. For example, stringers having Z, H and I-shaped configurations can be damped. Alternatively, any bendable structural component having spaced apart legs that are free to vibrate in a tuning fork manner can be damped using rigid damping elements of the general type illustrated in FIGS. 2–9. Still further, other rigid damping element shapes can be used. Consequently, the invention can be practiced otherwise than as specifically described herein.

The embodiments of the invention in which an exclusive property or privilege is claimed are defined as follows:

1. A method of reducing the low to mid frequency interior noise of a reinforced skin structure formed of a skin supported by a plurality of elongate reinforcing components having spaced apart legs oriented such that said spaced apart legs project away from said skin and are free to vibrate, said method comprising the steps of:

forming said reinforced skin structure such that areas of the skin bounded by said reinforcing components having a higher fundamental frequency than the bending and tuning fork frequency of said elongate reinforcing components with spaced apart legs; and damping the bending, tuning fork and torsional vibration of said elongate reinforcing components by spanning said spaced apart legs with rigid elements viscoelastically attached to said spaced apart legs.

2. A method of reducing the low to mid frequency interior noise of a reinforced skin structure as claimed in claim 1 wherein said damping extends along substantially the entire length of said elongate reinforcing components.

3. A method of reducing the low to mid frequency interior noise of a reinforced skin structure as claimed in claim 1 wherein said damping occurs at spaced apart regions located along the length of said elongate reinforcing components.

4. A method of reducing the low to mid frequency interior noise of a reinforced skin structure as claimed in claim 3, said noise including a spectral component constituting a major contributor of said noise, wherein said spaced apart regions are located at the antinodal points of said elongate reinforcing components based on the frequency of said major contributor to the low to mid frequency interior noise of said reinforced skin structure.

5. A method of reducing the low to mid frequency interior noise of a reinforced skin structure formed of a skin supported by a plurality of elongate reinforcing components having spaced apart legs and flanges extending outwardly from said spaced apart legs, said elongate reinforcing components being oriented such that said spaced apart legs project away from said skin and are free to vibrate, said method comprising the steps of:

forming said reinforced skin structure such that areas of the skin bounded by said reinforcing components have a higher fundamental frequency than the bending and tuning fork frequency of said elongate reinforcing components with spaced apart legs having outwardly extending flanges; and damping the bending, tuning fork and torsional vibration of said elongate reinforcing components by spanning said spaced apart legs with rigid elements viscoelastically attached to said outwardly extending flanges of said spaced apart legs.

6. A method of reducing the low to mid frequency interior noise of a reinforced skin structure as claimed in claim 5 wherein said damping extends along substantially the entire length of said elongate reinforcing components.

7. A method of reducing the low to mid frequency interior noise of a reinforced skin structure as claimed in claim 5 wherein said damping occurs at spaced apart regions located along the length of said elongate reinforcing components.

8. A method of reducing the low to mid frequency interior noise of a reinforced skin structure as claimed in claim 7, said noise including a spectral component constituting a major contributor of said noise, wherein said spaced apart regions are located at the antinodal points of said elongate reinforcing components based on the frequency of said major contributor to the low to mid frequency interior noise of said reinforced skin structure.

9. A reinforced skin structure comprising:
a plurality of elongate reinforcing components having spaced apart legs;
a skin mounted on said reinforcing components such that said spaced apart legs of said reinforcing components project away from said skin and are free to vibrate in a tuning fork manner, said reinforcing components and said skin being formed such that the areas of said skin bounded by said reinforcing components have a higher fundamental frequency than the bending and tuning fork frequency of said reinforcing components;
a plurality of rigid elements positioned so as to span the spaced apart legs of said reinforcing components; and
viscoelastic means for attaching the ends of said rigid elements to said spaced apart legs.

10. A reinforced skin structure as claimed in claim 9 wherein said rigid elements span substantially the entire length of said reinforcing components.

11. A reinforced skin structure as claimed in claim 10 wherein said rigid elements include a plurality of apertures.

12. A reinforced skin structure as claimed in claim 9 wherein said rigid elements are positioned at predetermined regions along the length of said reinforcing components.

13. A reinforced skin structure as claimed in claim 12 wherein predetermined edges of said rigid elements curve outwardly to stiffen said rigid elements.

14. A reinforced skin structure as claimed in claim 9 including a rigid base element viscoelastically attached to each of said spaced apart legs of said reinforcing components, along the length thereof, and wherein said plurality of rigid elements are viscoelastically attached by said viscoelastic means to said rigid base elements.

15. A reinforced skin structure as claimed in claim 9 wherein said spaced apart legs of said plurality of reinforcing components have outwardly extending flanges and wherein said plurality of rigid elements are viscoelastically attached by said viscoelastic means to said outwardly extending flanges.

16. A reinforced skin structure as claimed in claim 15 wherein said rigid elements span substantially the entire length of said reinforcing components.

17. A reinforced skin structure as claimed in claim 16 wherein said rigid elements include a plurality of apertures.

18. A reinforced skin structure as claimed in claim 15 wherein said rigid elements are positioned at predetermined regions along the length of said reinforcing components.

19. A reinforced skin structure as claimed in claim 18 wherein predetermined edges of said rigid elements curve outwardly to stiffen said rigid elements.

20. In a reinforced skin structure wherein a plurality of elongate reinforcing components having spaced apart legs support a skin, said spaced apart legs projecting away from said skin and being free to vibrate in a tuning fork manner, said reinforcing components and said skin being formed such that the areas of said skin bounded by said reinforcing components have a higher fundamental frequency than the bending and tuning fork frequency of said reinforcing components, the improvement comprising:
  a plurality of rigid damping elements positioned so as to span the spaced apart legs of said reinforcing components; and
  viscoelastic means for attaching the ends of said rigid elements to said spaced apart legs of said reinforcing components.

21. The improvement claimed in claim 20 wherein said rigid elements span substantially the entire length of said reinforcing components.

22. The improvement claimed in claim 21 wherein said rigid elements include a plurality of apertures.

23. The improvement claimed in claim 20 wherein said rigid elements are positioned at predetermined regions along the length of said reinforcing components.

24. The improvement claimed in claim 23 wherein predetermined edges of said rigid elements curve outwardly to stiffen said rigid elements.

25. The improvement claimed in claim 20 including a rigid base element viscoelastically attached to each of said spaced apart legs of said reinforcing components, along the length thereof, and wherein said plurality of rigid elements are viscoelastically attached by said viscoelastic means to said elongate rigid base elements.

26. The improvement claimed in claim 20 wherein said spaced apart legs of said plurality of reinforcing components have outwardly extending flanges and wherein said plurality of rigid elements are viscoelastically attached by said viscoelastic means to said outwardly extending flanges.

27. The improvement claimed in claim 26 wherein said rigid elements span substantially the entire length of said reinforcing components.

28. The improvement claimed in claim 27 wherein said rigid elements include a plurality of apertures.

29. The improvement claimed in claim 26 wherein said rigid elements are positioned at predetermined regions along the length of said reinforcing components.

30. The improvement claimed in claim 29 wherein predetermined edges of said rigid elements outwardly to stiffen said rigid elements.

31. A reinforced skin structure comprising:
  a plurality of elongate reinforcing components having spaced apart legs;
  a skin mounted on said reinforcing components such that said spaced apart legs of said reinforcing components project away from said skin and are free to vibrate in a tuning fork manner;
  a plurality of rigid elements positioned so as to span the spaced apart legs of said reinforcing components along substantially the entire length of said reinforcing components; and,
  viscoelastic means for attaching the ends of said rigid elements of said spaced apart legs.

32. A reinforced skin structure as claimed in claim 31 wherein said rigid elements include a plurality of apertures.

33. A reinforced skin structure as claimed in claim 31 wherein said spaced apart legs of said plurality of reinforcing components have outwardly extending flanges and wherein said plurality of rigid elements are viscoelastically attached by said viscoelastic means to said outwardly extending flanges.

34. A reinforced skin structure as claimed in claim 33 wherein said rigid elements include a plurality of apertures.

35. A reinforced skin structure comprising:
  a plurality of elongate reinforcing components having spaced apart legs;
  a skin mounted on said reinforcing components such that said spaced apart legs of said reinforcing components project away from said skin and are free to vibrate in a tuning fork manner;
  a rigid base element viscoelastically attached to each of said spaced apart legs of said reinforcing components, along the length thereof;
  a plurality of rigid elements positioned so as to span the spaced apart legs of said reinforcing components; and,
  viscoelastic means for attaching the ends of said plurality of rigid elements to said rigid base elements.

36. In a reinforced skin structure wherein a plurality of elongate reinforcing components having spaced apart legs support a skin, said spaced apart legs projecting away from said skin and being free to vibrate in a tuning fork manner, the improvement comprising:
  a plurality of rigid damping elements positioned so as to span the spaced apart legs of said reinforcing components along substantially the entire length of said reinforcing components; and,
  viscoelastic means for attaching the ends of said rigid elements to said spaced apart legs of said reinforcing components.

37. The improvement claimed in claim 36 wherein said rigid elements include a plurality of apertures.

38. The improvement claimed in claim 36 wherein said spaced apart legs of said plurality of reinforcing components have outwardly extending flanges and wherein said plurality of rigid elements are viscoelastically attached by said viscoelastic means to said outwardly extending flanges.

39. The improvement claimed in claim 38 wherein said rigid elements include a plurality of apertures.

40. A reinforced skin structure comprising:
  frame means for supporting a plurality of elongate reinforcing components;
  a plurality of U-shaped elongate reinforcing components each having a pair of spaced apart legs, said plurality of reinforcing components being mounted on said frame means such that said plurality of elongate reinforcing components are spaced from one another;
  a skin mounted on said plurality of reinforcing components, said plurality of reinforcing components being oriented such that said spaced apart legs of said reinforcing components project away from said skin and are free to vibrate in a tuning fork manner in regions where said reinforcing components are not mounted on said frame means;
  a plurality of rigid, generally flat elements positioned to span the spaced apart legs of said reinforcing components in said regions where said reinforcing components are not mounted on said frame means and are free to vibrate in a tuning fork manner; and,
  viscoelastic means for attaching the ends of said rigid, generally flat elements to said spaced apart legs of said reinforcing components.

41. A reinforced skin structure as claimed in claim 40 wherein predetermined edges of said rigid elements curve outwardly to stiffen said rigid elements.

42. A reinforced skin structure as claimed in claim 40, wherein said spaced apart legs of said plurality of reinforcing components having outwardly extending flanges and wherein said plurality of rigid elements are viscoelastically attached by said viscoelastic means to said outwardly extending flanges.

43. A reinforced skin structure as claimed in claim 40 wherein said rigid elements span substantilly the entire length of said reinforcing components.

44. A reinforced skin structure as claimed in claim 43, wherein said rigid elements include a plurality of apertures.

45. In a reinforced skin structure wherein a plurality of elongate reinforcing components each having a pair of spaced apart legs are supported in a spaced apart manner by frame means, said plurality of reinforcing components supporting a skin in a manner such that said spaced apart legs of said plurality of reinforcing components project away from said skin and are free to vibrate in a tuning fork manner in regions where said reinforcing components are not supported by said frame means, the improvement comprising:

a plurality of rigid, generally flat damping elements positioned to span the spaced apart legs of said reinforcing components in said regions where said reinforcing components are not supported by said frame means and are free to vibrate in a tuning fork manner; and, viscoelastic means for attaching the ends of said rigid, generally flat damping elements to said spaced apart legs of said reinforcing components.

46. The improvement claimed in clam 45 wherein predetermined edges of said rigid elements curve outwardly to stiffen said rigid elements.

47. The improvement claimed in clam 45 wherein said spaced apart legs of said plurality of reinforcing components have outwardly extending flanges and wherein said plurality of rigid elements are viscoelasticaly attached by said viscoelastic means to said outwardly extending flanges.

48. The improvement claimed in claim 47 wherein said rigid elements span substantially the entire length of said reinforcing components.

49. The improvement claimed in claim 48 wherein said rigid elements include a plurality of apertures.

* * * * *